US009188279B2

(12) United States Patent
Sakai et al.

(10) Patent No.: US 9,188,279 B2
(45) Date of Patent: Nov. 17, 2015

(54) SUPPORTING STRUCTURE FOR RESERVE TANK (71) Applicants: HONDA MOTOR CO., LTD., Minato-Ku, Tokyo (JP); NISSIN KOGYO CO., LTD., Ueda-Shi, Nagano (JP)

(72) Inventors: Kazuhiro Sakai, Saitama (JP); Kouki Hinohara, Tochigi (JP); Satoru Motegi, Tochigi (JP)

(73) Assignees: Honda Motor Co., Ltd., Tokyo (JP); Nissin Kogyo Co., Ltd., Nagano (JP)

( * ) Notice: Subject to any disclaimer, the term of this patent is extended or adjusted under 35 U.S.C. 154(b) by 261 days.

(21) Appl. No.: 13/927,507

(22) Filed: Jun. 26, 2013

(65) Prior Publication Data
US 2014/0001332 A1    Jan. 2, 2014

(30) Foreign Application Priority Data
Jun. 28, 2012 (JP) ................................. 2012-145130

(51) Int. Cl.
F16M 13/02 (2006.01)
B60K 15/00 (2006.01)
B60K 15/03 (2006.01)
B60K 15/063 (2006.01)

(52) U.S. Cl.
CPC .......... *F16M 13/02* (2013.01); *B60K 15/03177* (2013.01); *B60K 2015/0637* (2013.01)

(58) Field of Classification Search
CPC ............... B60K 15/067; B60K 15/077; B60K 15/03177; B60K 2015/0637; F16M 13/00; F16M 13/02
See application file for complete search history.

(56) References Cited

U.S. PATENT DOCUMENTS

| 2,992,804 | A | * | 7/1961 | Doran ........................ 248/311.2 |
| 3,094,250 | A | * | 6/1963 | Molyneaux et al. .......... 222/207 |
| 4,346,865 | A | * | 8/1982 | Murata ....................... 248/311.2 |
| 5,058,694 | A |   | 10/1991 | Iwanaga |
| 6,898,920 | B2 | * | 5/2005 | Hoss ............................... 53/300 |
| 8,668,178 | B2 | * | 3/2014 | Ziaylek et al. ................ 248/312 |
| 2009/0045224 | A1 | * | 2/2009 | Faaborg et al. ............... 222/111 |
| 2012/0298603 | A1 |   | 11/2012 | Kotaki et al. |

FOREIGN PATENT DOCUMENTS

| JP | 2006-264429 A | 10/2006 |
| JP | 2007083783 A | 4/2007 |
| JP | 2009083775 A | 4/2009 |
| WO | 2011/093336 A1 | 8/2011 |

OTHER PUBLICATIONS

Office Action dated Apr. 23, 2015 in regards to corresponding Chinese Patent Application 201310263390.7.

* cited by examiner

*Primary Examiner* — Jeanette E Chapman
(74) *Attorney, Agent, or Firm* — Carrier Blackman & Associates, P.C.; William D. Blackman; Joseph P. Carrier (57) ABSTRACT A reserve tank is fixed to the vehicle body with a bracket. The bracket includes a supporting member supporting an intermediate part which is an intermediate part in vertical direction when the reserve tank is fixed to the vehicle body side. The supporting member includes the vertical movement restricting part for restricting a vertical movement while the reserve tank is fixed to the vehicle. The reserve tank includes the fastening part fastened with the fastening member to a fastened part formed on the bracket, the rotation restricting part for restricting, at a location apart from the fastening part, rotation on the fastening part, and an extending part protruding outwardly in a diametrical direction from a side surface of the reserve tank and extending from a side of the fastening part in a circumferential direction to the rotation restricting part.

3 Claims, 10 Drawing Sheets

SUPPORTING STRUCTURE FOR RESERVE TANK

CROSS REFERENCE TO RELATED APPLICATION

This application claims the foreign priority benefit under Title 35, United States Code, §119(a)-(d) of Japanese Patent Application No. 2012-145130, filed on Jun. 28, 2012 in the Japan Patent Office, the disclosure of which is herein incorporated by reference in its entirety.

BACKGROUND OF THE INVENTION

1. Field of the Invention

The present invention relates to a supporting structure for supporting, for example, a reserve tank (also referred to as a brake reservoir tank), etc. disposed within an engine room of a vehicle for supporting the reserve tank on a vehicle body with a bracket.

2. Description of the Related Art

As disclosed in JP 2006-264429 A (paragraphs 0025, 0029, FIGS. 1 and 2), a conventional reserve tank (a brake reservoir tank) to be filled with a brake fluid is mounted on an inner wall surface of a vehicle body within an engine room through a bracket (holding bracket).

The bracket disclosed in JP 2006-264429 A includes a bottom wall part fixed to a lower surface of the reserve tank and extending in a substantially horizontal direction, a pair of left and right side wall parts extending upward from both ends of the bottom wall part, a protruding piece extending from one of the side wall parts in a substantially vertical direction and being fixed to the vehicle body there. The protruding piece of the bracket is fixed to a locking part formed on the reserve tank with a bolt and a nut.

When the bracket and the reserve tank are mounted, a rotational moment is generated which causes the bottom surface of the reserve tank to move downward in accordance with a friction force acting between the nut and the locking part of the bracket by rotationally operation on the nut to be screwed on the male thread of the bolt. This rotational moment rotates the bottom surface of the reserve tank together with the nut in such a direction that the bottom surface of the reserve tank is pressed on the bottom wall part of the bracket. Accordingly, the reserve tank can be held in a stable state on the bottom wall part of the bracket.

Figure 8:
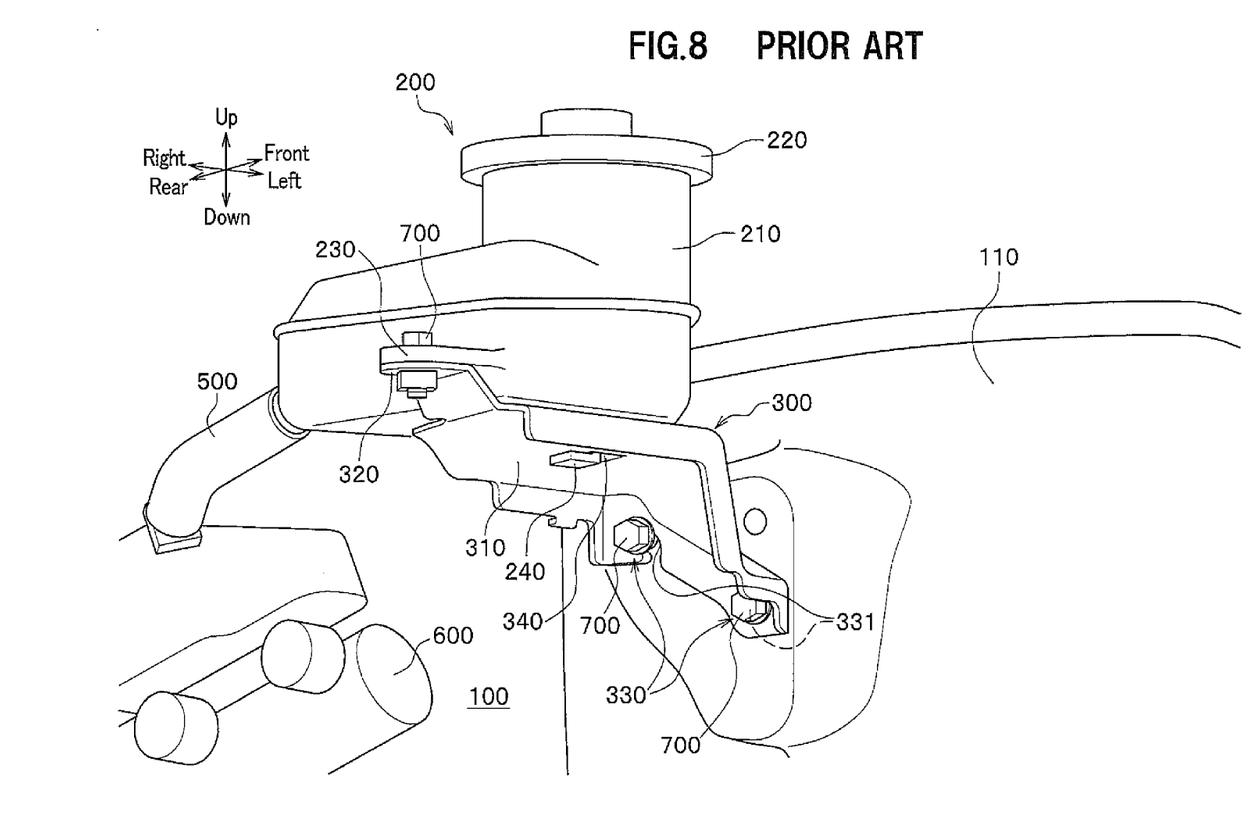
FIG. 8 is a perspective view illustrating a prior art reserve tank.
Figure 9:
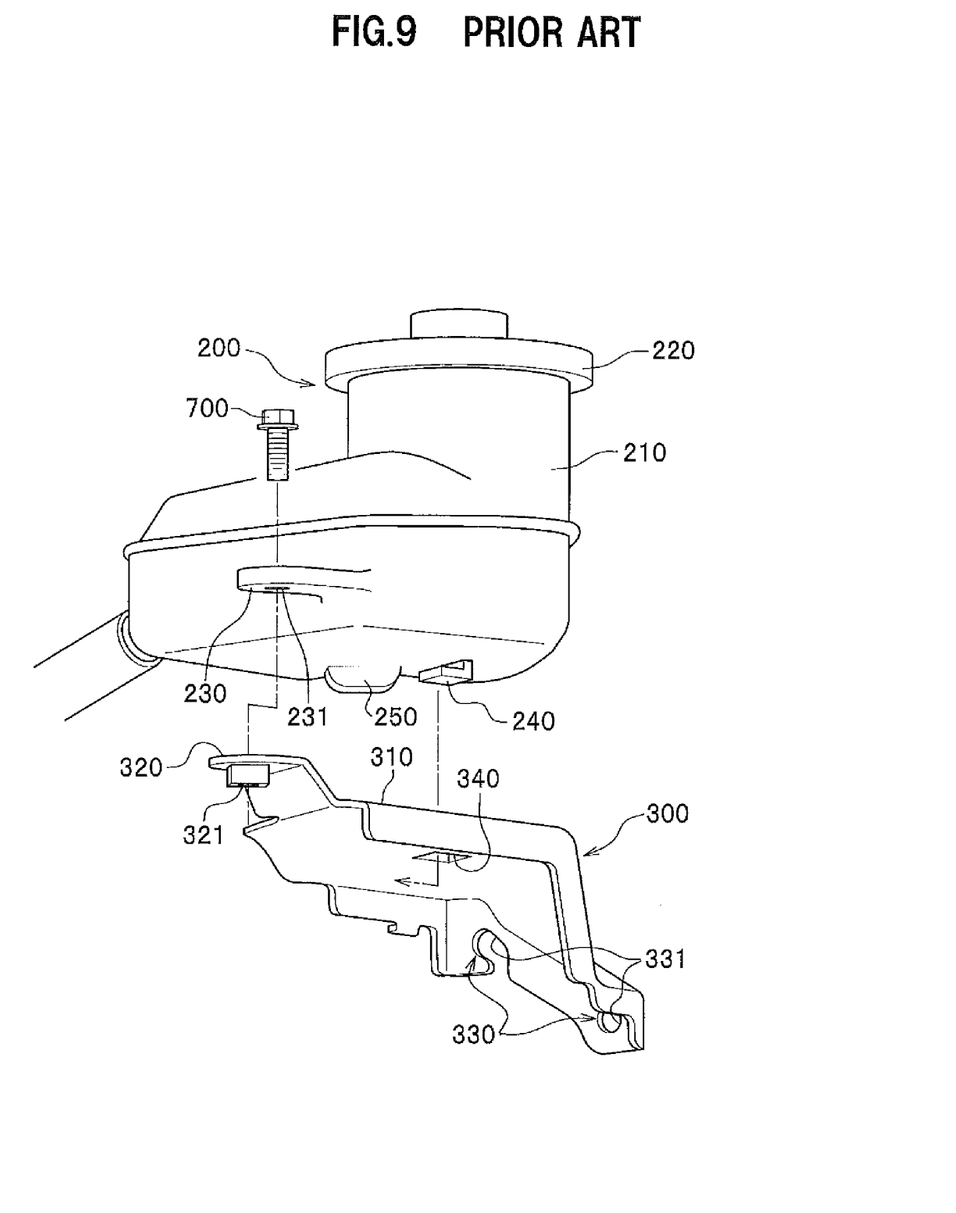
FIG. 9 is an exploded perspective view illustrating a mounting state of the prior art reserve tank.
Figure 10:
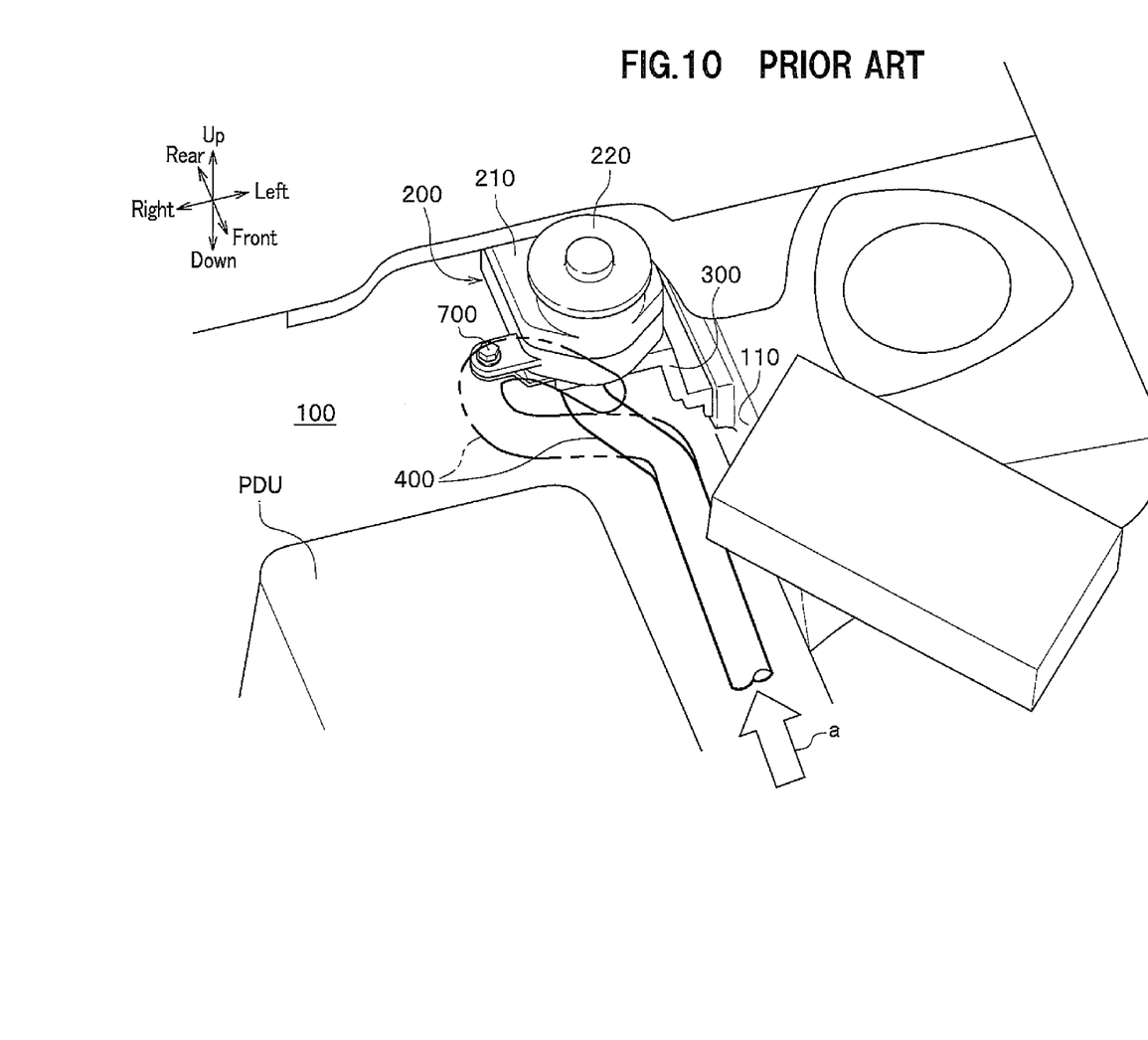
FIG. 10 is an enlarged outline perspective view of a main part illustrating a mounting state of the prior art reserve tank.

FIG. 8 is a perspective view of a conventional reserve tank. FIG. 9 is an exploded perspective view showing a mounting state of the prior art reserve tank. FIG. 10 is an enlarged perspective view of a main part to show the mounting state of the conventional reserve tank.

The prior art reserve tank 200 shown in FIG. 8 forms a brake assembly with a hose 500, a master cylinder 600, and a negative pressure booster (not shown). The reserve tank 200 is mounted on a mounting part 310 of a bracket 300 fixed with a screw to an inner wall 110 within an engine room 100 to be supported. The reserve tank 200 is mainly formed with a tank body 210 made of resin, and a cap 220 for closing an opening of the tank body 210.

As shown in FIG. 9, formed on a lower surface side of the tank body 210 are a fixing piece 230 for fixation to the vehicle body, formed to protrude in a vehicle width direction, into which a bolt insertion hole 231 is formed, a locking claw 240 as a detent which is to be fitted into a locking hole 340 formed at the mounting part 310 of the bracket 300, and a coupler part 250 to which a connector of a tank liquid level sensor (not shown) is to be connected.

The coupler part 250 is formed on a lower surface part of the tank body 210, because the coupler part 250 is frequently installed on the lowest surface part of the tank body 210 for convenience of installing the liquid level sensor (not shown) for detecting a liquid level of the reserve tank 200.

The bracket 300 is a metal plate, having the locking hole 340, a mounting part 310 formed in a flat shape, a tank locking piece 320 having an insertion hole 321 into which a bolt 700 (see FIG. 8) for fixing the fixing piece 230 of the reserve tank 200 to the vehicle body is inserted, a mounting part 330 having bolt insertion parts 331 to which a pair of the bolts 700 (see FIG. 8) for bolt-fastening of the bracket 300 to the inner wall 110 in the engine room 100 (see FIG. 10) are formed.

The reserve tank 200 is placed on the mounting part 310 and fixed thereon by bolt-fastening the tank locking piece 320 formed at a tip side of the mounting part 310 to the fixing piece 230 and by bolt-fasting the bolt insertion part 331 of the mounting part 330 formed on a base end part of the bracket 300 to the inner wall 110 of the engine room 100.

As shown in FIG. 10, below the bracket 300, various cables and hoses are disposed. In the hybrid vehicles and electric vehicles, there may be a case where a power supply cable 400 of a high voltage is arranged in a vehicle front-rear direction such that the power supply cable 400 goes under the bracket 300 from a vehicle front direction.

However, in a case of the supporting structure of the reserve tank disclosed in JP 2006-264429 A (paragraphs 0025, 0029, FIGS. 1 and 2), a place to which the bracket (holding bracket) and the reserve tank are fixed is only at one place, i.e., the locking part.

Accordingly, in a case where a turn, etc., of the vehicle is made during traveling, the reserve tank may rotate by a rotational moment because the rotational moment is generated in such a direction that the reserve tank becomes apart from the bottom wall part of the bracket on an axis at a fastening point of the nut.

In addition, because the protruding piece of the bracket is disposed around a middle of the reserve tank, when the bottom wall part is formed on the bracket, a pair of left and right side wall parts are essential structural elements. Accordingly, there is a problem in that the bracket becomes heavy by weight of the side wall parts formed on both left and right sides of the bottom wall part with the result that a whole weight of the bracket becomes heavy.

In addition, the conventional reserve tank 200 shown in FIGS. 8 to 10 has the fixing piece 230 protrusively formed on a side surface of the tank body 210, and the locking claw 240 is formed on a lower surface of the tank body 210. Accordingly, there is a problem in that it is difficult to achieve a positioning accuracy in mounting the reserve tank 200 at a preset certain position when the reserve tank 200 is fixed to the vehicle body with the bracket 300, because the fixing piece 230 and the locking claw 240 are formed at different positions in a side view and not formed on the same plane.

In addition, there is a problem in that a whole shape of the bracket becomes complicated because it is necessary for the bracket 300 to be formed to be fit shapes of the locking claw 240 and the coupler part 250 because the locking claw 240 and the 250 of a reserve tank 200 (see FIG. 9) are formed on a lower surface part of the tank body 210.

In addition, the bracket 300 has such a structure that the reserve tank 200 is placed on the mounting part 310 to support a weight of the reserve tank 200 by a whole of the mounting part 310, so that there is a problem in that the mounting part 310 has a wide area, and the whole of the bracket 3 become large.

SUMMARY OF THE INVENTION

The present invention may provide a supporting structure for a reserve tank capable of reducing a weight of the bracket.

An aspect of the present invention provides a supporting structure for a reserve tank that fixes the reserve tank to be filled with an operating fluid to a vehicle body side with a bracket, wherein:

the bracket comprises a supporting part configured to support an intermediate part which is intermediate in a vertical direction in fixing the reserve tank to the vehicle; and wherein:

the supporting part comprises a vertical movement restricting part configured to restrict a vertical movement in fixing the reserve tank to the vehicle.

Though upward and downward loads by the reserve tank is applied to the supporting structure of the reserve tank while the vehicle is traveling or in assembling, the reserve tank with the above configuration can prevent the reserve tank from shifting upward and downward, or moving bumpy because the upward and downward movement is restricted while the reserve tank is fixed to the vehicle (in a fixed state).

In addition, the weight of the bracket can be reduced by a lack of the bottom wall part because the reserve tank can be supported without the conventional bottom wall part.

In addition, the bracket can make the rotational moment of the reserve tank smaller by the support with the supporting part at an intermediate part in the upward and downward directions when the reserve tank is fixed to the vehicle (in the fixed state). Accordingly, the reserve tank receives a smaller rotational moment than a case where an upper surface or the lower surface of the reserve tank is supported because a distance from the rotation center is short. Accordingly, there is no necessity to increase in strength by unnecessary reinforcement by a small quantity of the rotational moment, so that a shape of the bracket can be simplified and the weight of the bracket can be reduced by simplifying a shape of the bracket.

An aspect of the present invention provides the supporting structure, wherein the reserve tank comprises:

a fastening part configured to fasten the reserve tank to a fastened part formed on the bracket with a fastening member;

a rotation restricting part, at a location apart from the fastening part, configured to restrict rotation of the reserver tank on the fastening part; and an extending part protruding from a side surface of the reserve tank outwardly in a diametrical direction and extending in a circumferential direction from a side of the fastening part to the rotation restriction part, wherein the fastening part is formed along the side surface of the reserve tank and includes a lower-surface supporting part configured to support a lower surface of the extending part.

According to the structure, the bracket can support the weight of the reserve tank by the fastening part and the extending part, so that an area supporting the weight of the reserve tank can be made smaller than the case in which the reserve tank is supported on the whole of the lower surface of the reserve tank.

Accordingly, the weight of the supporting structure of the reserve tank can be reduced because the bracket can be downsized by reduction in area of the bracket.

In addition though a lateral load (centrifugal force) is developed by the reserve tank during turning, etc of the vehicle, the bracket can restrict turning of the reserve tank on a centre at the fastening part by the turning restricting part, so that the bracket can surely hold the reserve tank without shifting.

An aspect of the present invention provides a supporting structure, wherein the reserve tank is formed in a circular sleeve to comprise a circular sleeve part including, at an upper end thereof, an opening into which the operating fluid is injected; wherein the rotation restricting part and the extending part are formed on the circular sleeve part and the rotation restricting part includes a protruding part formed to protrude outwardly in a diametrical direction from the side surface of the circular sleeve part, and wherein the bracket is formed on the lower-surface supporting part and includes a hollow part fitted into the protruding part.

According to the structure, the turning of the bracket can be suppressed on a center at the fastening part relative to the circular sleeve part of the reserve tank by that a protruding part is fitted into a hollow part of the reserve tank. Therefore, because the reserve tank can be supported by the bracket only by forming one fastening part, a shape of the reserve tank and the bracket can be simplified as well as the a mounting operation for mounting the reserve tank and the bracket on the vehicle body can be simplified.

An aspect of the present invention provides a supporting structure, wherein the protruding part is disposed on a vehicle rear side of the circular sleeve part when the reserve tank is mounted on the vehicle body through the bracket; wherein the bracket includes:

a vehicle body side fixing part to be fixed to a vertical wall on the vehicle body side extending in the vehicle front-rear direction; and a horizontal surface part extending from the vehicle body side fixing part toward the vehicle rear side via a surface of the reserve tank on the vehicle front side end part to form a surface extending in a vehicle horizontal direction; and wherein the fastened part formed at the vehicle front side end part on the horizontal surface part; wherein the horizontal surface part includes the lower-surface supporting part and the hollow part; and wherein the lower-surface supporting part is provided to support the extending part at a region not exceeding a semiperimeter of the circular sleeve part on the vehicle rear side.

According to the structure, the bracket can support the reserve tank by fitting, in mounting the bracket on the reserve tank, the protruding part into a hollow part as well as fitting a lower surface supporting part of the bracket into a circumferential part of a circular sleeve part in a state in which a lower surface of an extending part of the reserve tank is supported. Therefore, it is easy to mount the bracket on the reserve tank, so that an operation efficiency is superior.

An aspect of the present invention provides a supporting structure, wherein the reserve tank is formed of a resin; and wherein the bracket comprises a plate member made of a metal and is disposed to provide an open space on a vehicle front side of the reserve tank when the bracket to which the reserve tank is mounted is fixed to the vehicle side.

According to this structure, when the reserve tank is mounted on the vehicle body with the bracket, an open space is formed in a front direction of the vehicle from the reserve tank.

This can suppress a damage of a component on the vehicle because a collision with the bracket formed by a metal plate member can be avoid in case where a front collision occurs in the vehicle, even if the component on the vehicle disposed in the front direction of the vehicle from the reserve tank moves in front-rear direction of the vehicle and the component on the vehicle contacts the reserve tank formed of a resin.

The present invention can provide a supporting structure of the reserve tank which can reduce the weight of the bracket.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

With reference to FIGS. 1 to 7, will be described an example of a supporting structure for a reserve tank according to an embodiment of the present invention. Hereinafter, for convenience, a description will be made with assumption that a traveling direction of a vehicle 1 is designated with "front"; a reverse direction, "rear"; and a vehicle width direction, "left" and "right". First, prior to describing a reserve tank 2 and a bracket 3, the vehicle 1 and a vehicle body 11 on which the bracket 3 is to be mounted will be described.

<<Structure of Vehicle>>

Figure 1:
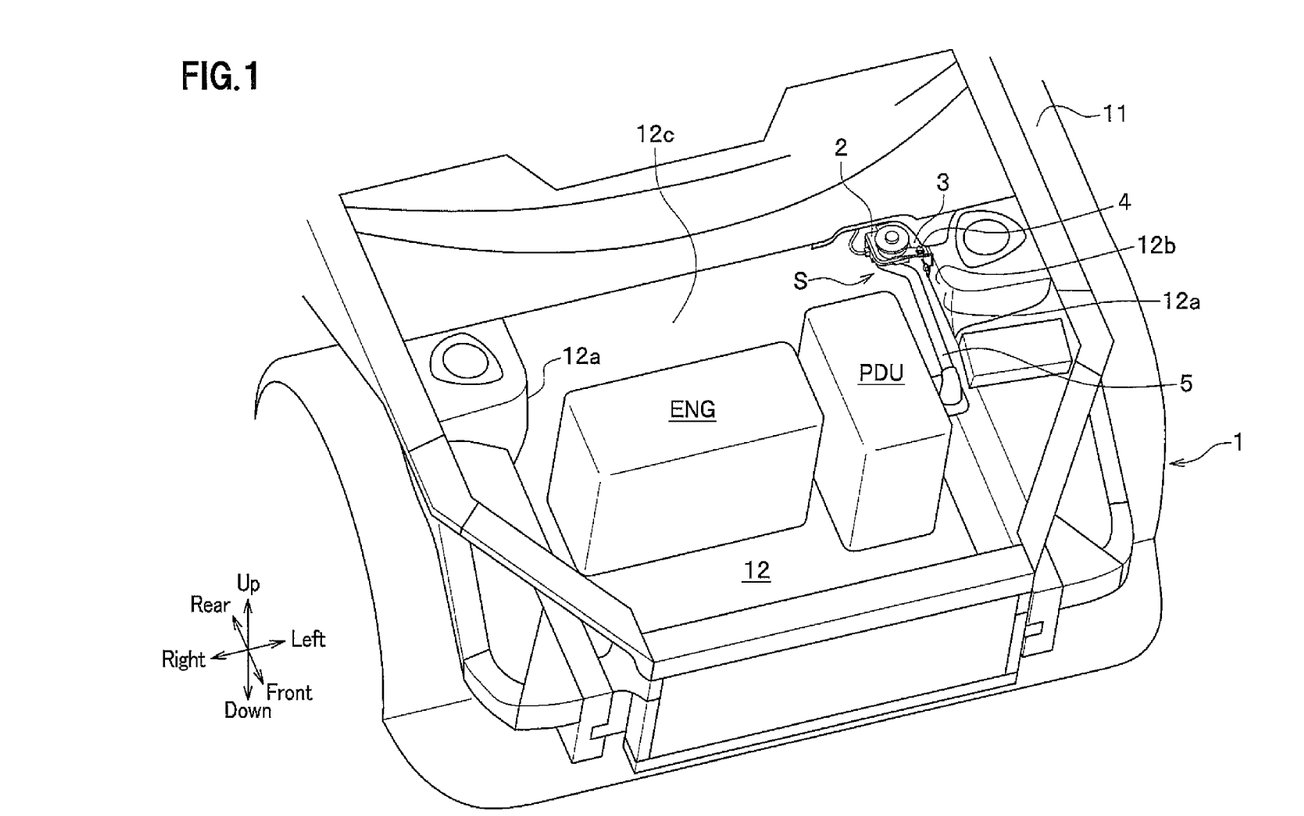
FIG. 1 is an outline perspective view of an engine room of a vehicle for showing a mounting status of a reserve tank according to an embodiment of the present invention.

As shown in FIG. 1, the vehicle 1 is an automobile having, at a front part of the vehicle body 11, an engine room 12 within which the bracket 3 for supporting the reserve tank 2 is mounted.

In addition, the vehicle 1 may be any automobile on which the reserve tank 2 is mounted and of which model or type is not limited to any particular model or type. In other words, the vehicle 1 may be a bus, a truck, or a working vehicle other than a passenger automobile. Hereinafter, the reserve tank 2 and the bracket 3 will be described with, as an example, a hybrid vehicle of a passenger automobile type having a bonnet shape with a left steering wheel with the engine room 12 disposed at the front of the vehicle body 11.

<Vehicle Body Structure>

As shown in FIG. 1, the vehicle body 11 is mainly configured with a skeleton frame, not shown, forming bones of the vehicle, and a panel body. In the vehicle body 11, the engine room 12 is formed in front of a vehicle compartment and has an upper opening which is closed and opened with a hood (not shown).

The engine room 12 is a space for housing an engine ENG, a motor (not shown), a power drive unit PDU (Power Drive Unit), etc. and formed to have a hollow space with the hood (not shown) and with a vertical wall 12a inside the engine room 12. Inside the engine room 12, auxiliary devices are disposed which are peripheral components necessary for traveling the vehicle 1 by operation of the engine ENG. In addition, the engine room 12 may be one in which both the engine ENG and a motor (not shown) are arranged therein or may be a motor room where only the motor is arranged.

Figure 2:
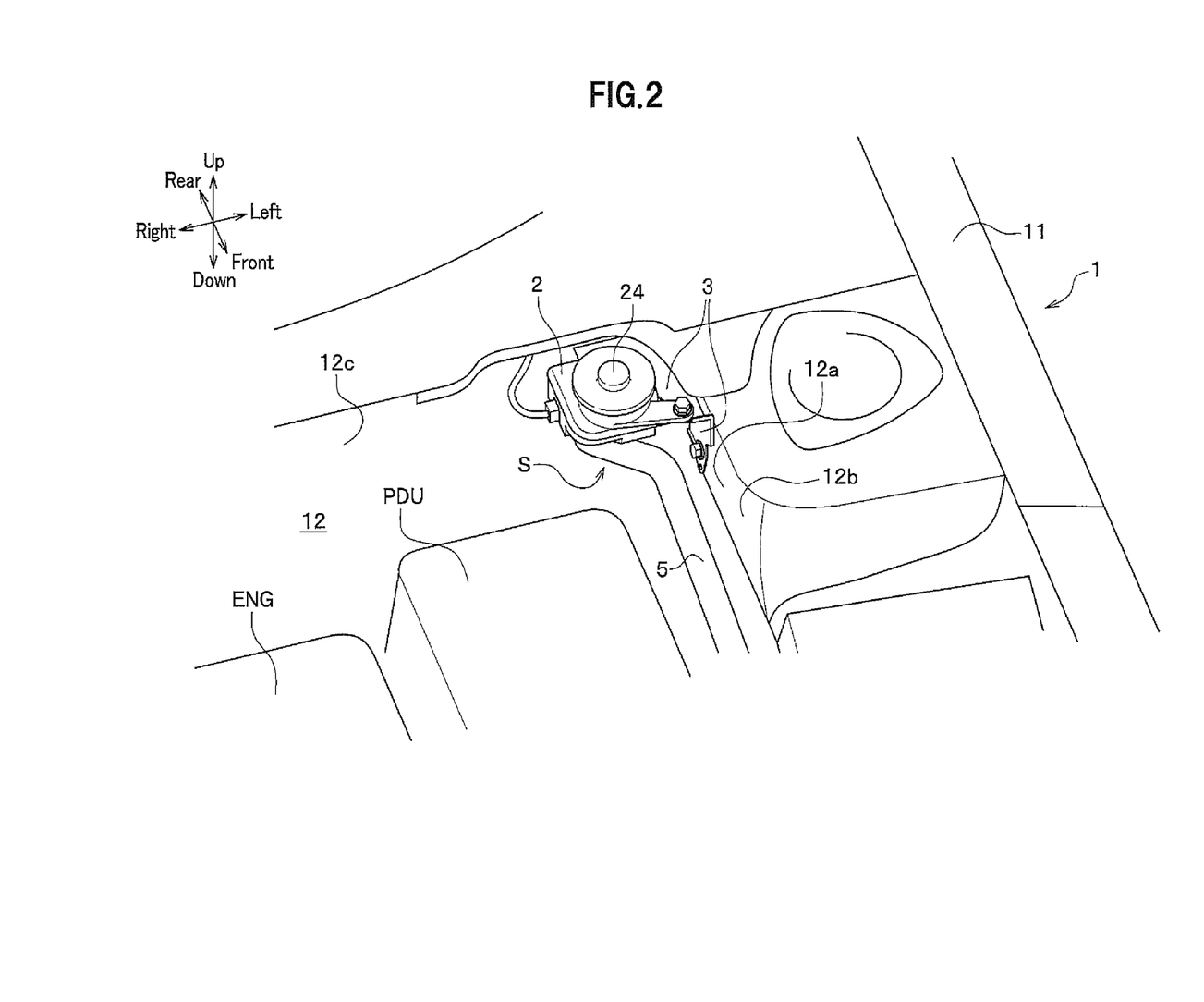
FIG. 2 is an enlarged view of a main part in FIG. 1.

As shown in FIG. 2, the vertical wall 12a is, for example, a mounted part on which the bracket 3 is mounted. The vertical wall 12a is formed with left and right side walls 12b, 12b in the engine room 12, a partition wall 12c for partitioning between the engine room 12 and the vehicle compartment, and a front grill (not shown) forming a front wall of the engine room 12.

The side walls 12b, 12b are formed with metal panel members as a wheel housing fixed to a pair of left and right side symmetrical members (not shown) or damper housings, etc.

The partition wall 12c comprises a metal panel member such as a dash panel fixed to the left and right side members and a cross member (not shown) disposed orthogonal with the left and right side members.

<Structure of Reserve Tank>

Figure 3:
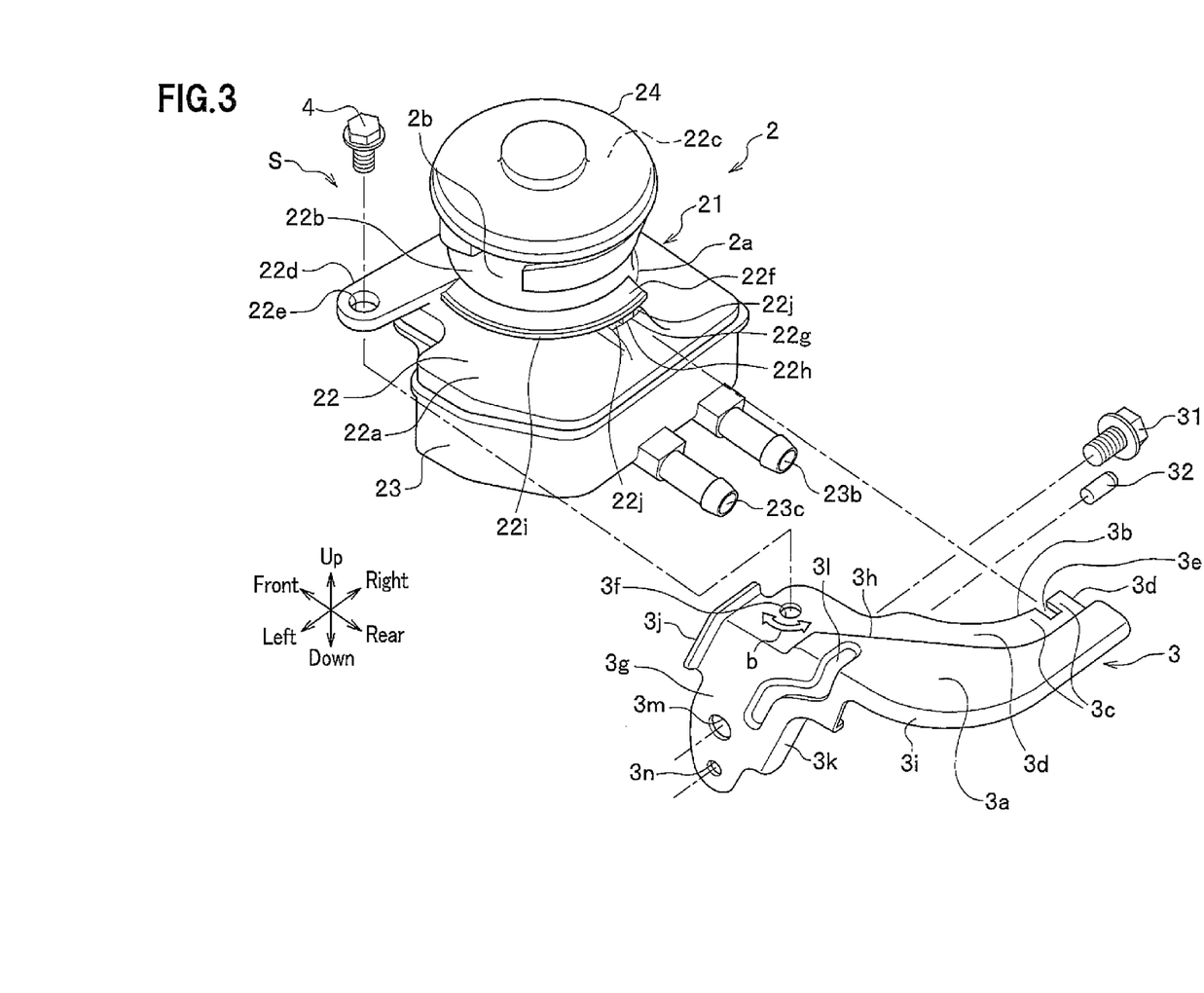
FIG. 3 is an exploded perspective view of an example of the supporting structure for the reserve tank according to the present invention.

As shown in FIG. 3, the reserve tank 2 is a tank for storing a brake fluid (operation oil) used for a brake device. The reserve tank 2 is mainly formed with a tank body 21 made of resin, a cap 24 made of resin for closing an opening 22c of the tank body 21. The reserve tank 2 is disposed at a position higher than a brake master cylinder (not shown) in the engine room 12 to prevent the air to be sucked when the brake fluid is supplied to the brake master cylinder (not shown) which is a supply destination of the brake fluid.

As shown in FIG. 3, the tank body 21 comprises, for example, a resin container formed by integrally joining an upper case 22, disposed on an upper side to provide an upper side part of the tank body 21, with a lower case 23, disposed on a lower side to form a lower side part of the tank body 21.

The upper case 22 is a case body forming an upper half of the reserve tank 2 and joined on the lower case 23 forming a lower half of the reserve tank 2 in a state that an opening of the lower case 23 is closed from an upper side. Integrally formed on the upper case 22 are a lid-like part 22a, the circular sleeve part 22b, the opening 22c, a mounting piece 22d, a fastening part 22e, an extending part 22f, a rotation restricting part 22g, a protruding part 22h, a bracket inserting part 22i, and a bracket supporting part 22j, respectively later-described.

The lid-like part 22a is a substantially lid-shape part disposed so as to close the opening (not shown) of the lower case 23 having a container form and substantially horizontally formed. On an upper surface of the lid-like part 22a, the circular sleeve part 22b, the mounting piece 22d, and the bracket supporting part 22j are formed.

The circular sleeve part 22b is a part having a circular sleeve shape upwardly protruding from the lid-like part 22a, the opening 22c being formed on an upper end thereof, a male thread part engageable with a female thread part of the cap 24 at an outer circumferential part of the opening 22c. At an outer circumferential lower end of the circular sleeve part 22b, the mounting piece 22d, the extending part 22f, and the rotation restricting part 22g are outward protrusively formed. The opening 22c is an injection inlet for injecting a brake fluid in the reserve tank 2 and formed at the upmost end of the circular sleeve part 22b of the reserve tank 2.

The mounting piece 22d is a protruding piece for disposing the fastening part 22e at a position more outer than the tank body 21 and comprises a slender thick plate. The mounting piece 22d is formed protruding, from a part on a front side of an lower end of the circular sleeve part 22b, outside the lid-like part 22a in a left direction (a direction of a side wall 12b of the engine room 12 (see FIG. 2)) on the lid-like part 22a. At a tip of the mounting piece 22d, the fastening part 22e for fastening the bracket 3 to the vehicle body 11 is formed.

The fastening part 22e comprises a through hole into which a fastening member 4, for fixing the bracket 3 to the mounting piece 22d is inserted, and a fastened part 3f of the bracket 3 is fixed to a lower side of the fastening part 22e.

The extending part 22f is a protruding piece for holding an upper surface of a lower-surface supporting part 3d and comprises a thick plate having a substantially eaves shape (substantially flange shape) formed protruding from the circular sleeve part 22b toward the outside in a diametrical direction. The extending part 22f extends in a circular arc shape in a circumferential direction to a vehicle rear side of the circular sleeve part 22b from a side of the mounting piece 22d on a left side of the outer circumferential part of the circular sleeve part 22b to have a substantially fan shape in a plan view. In other words, the extending part 22f protrudes from a side surface 2b of the reserve tank 2 outwardly in a diametrical direction and extends in the circumferential direction to the rotation restricting part 22g from the side of the fastening part 22e.

Figure 5:
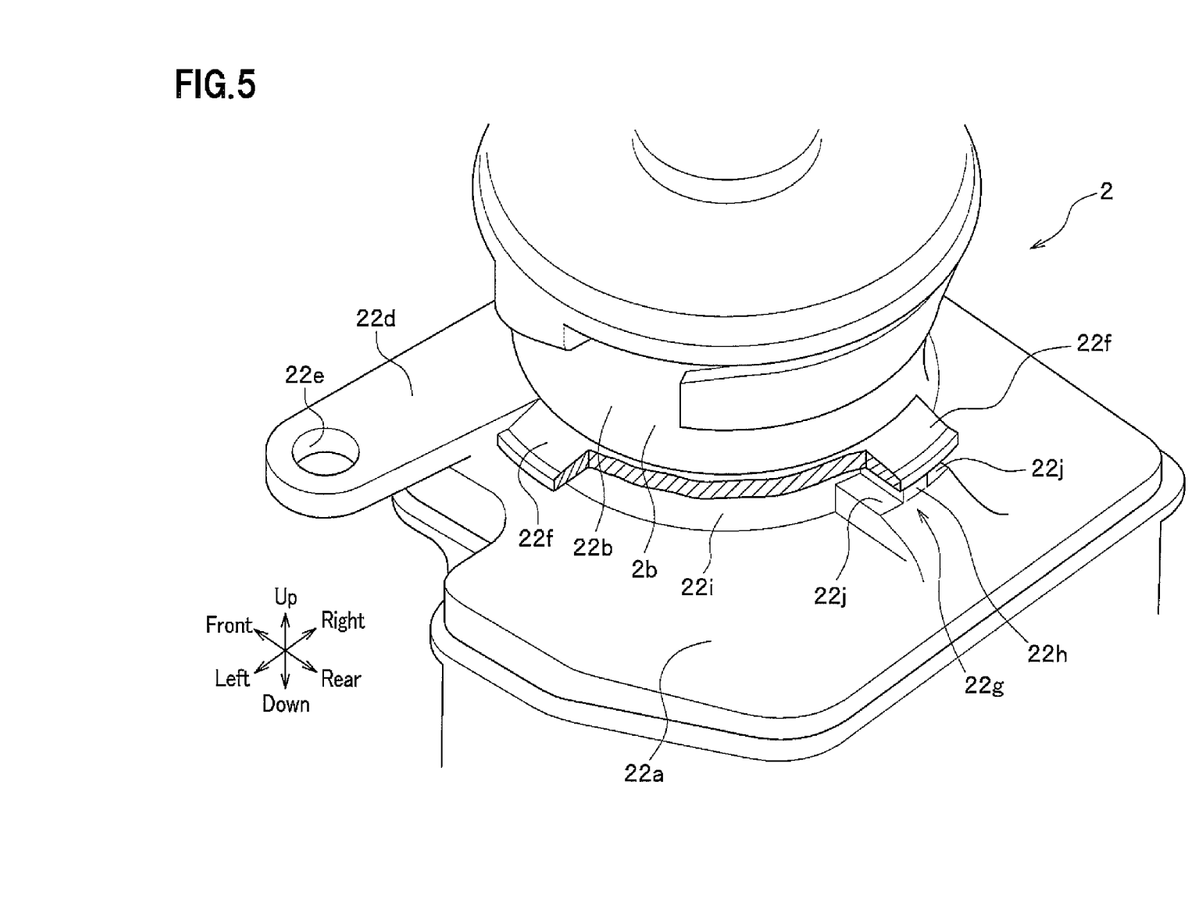
FIG. 5 is an enlarged perspective view of a main part with a partial cross section illustrating an extending part of the reserve tank.

As shown in FIG. 5, the rotation restricting part 22g is disposed at a position apart from the fastening part 22e and is a part for restricting rotation of the bracket 3 fixed to the reserve tank 2 on the fastening part 22e as a center, formed on a lower surface of the vehicle rear direction side part of the extending part 22f. The rotation restricting part 22g comprises the protruding part 22h which is formed with protrusion from the side surface 2b of a rear side of the circular sleeve part 22b to the outside in a diametrical direction (front-rear direction).

The rotation restricting part 22g (the protruding part 22h) comprises a partitioning wall having a thick plate shape formed for sectioning a space between the extending part 22f and the bracket supporting part 22j into two spaces and is formed integrally with the extending part 22f and the bracket supporting part 22j.

The bracket inserting part 22i is a space into which the lower-surface supporting part 3d of the bracket 3 is inserted to be held and formed among the lid-like part 22a, the bracket supporting part 22j, and the extending part 22f. The bracket inserting part 22i is formed on a lower surface of the extending part 22f in the plan view.

The bracket supporting part 22j is a part for supporting the lower surface of the bracket 3 inserted into the bracket inserting part 22i and comprises a stepwise part protruding upward from the lid-like part 22a. At a middle of the upper surface of the bracket supporting part 22j, the rotation restricting part 22g (the protruding part 22h) is disposed to extend in the vehicle front-rear direction with respect to the circular sleeve part 22b.

Figure 6:
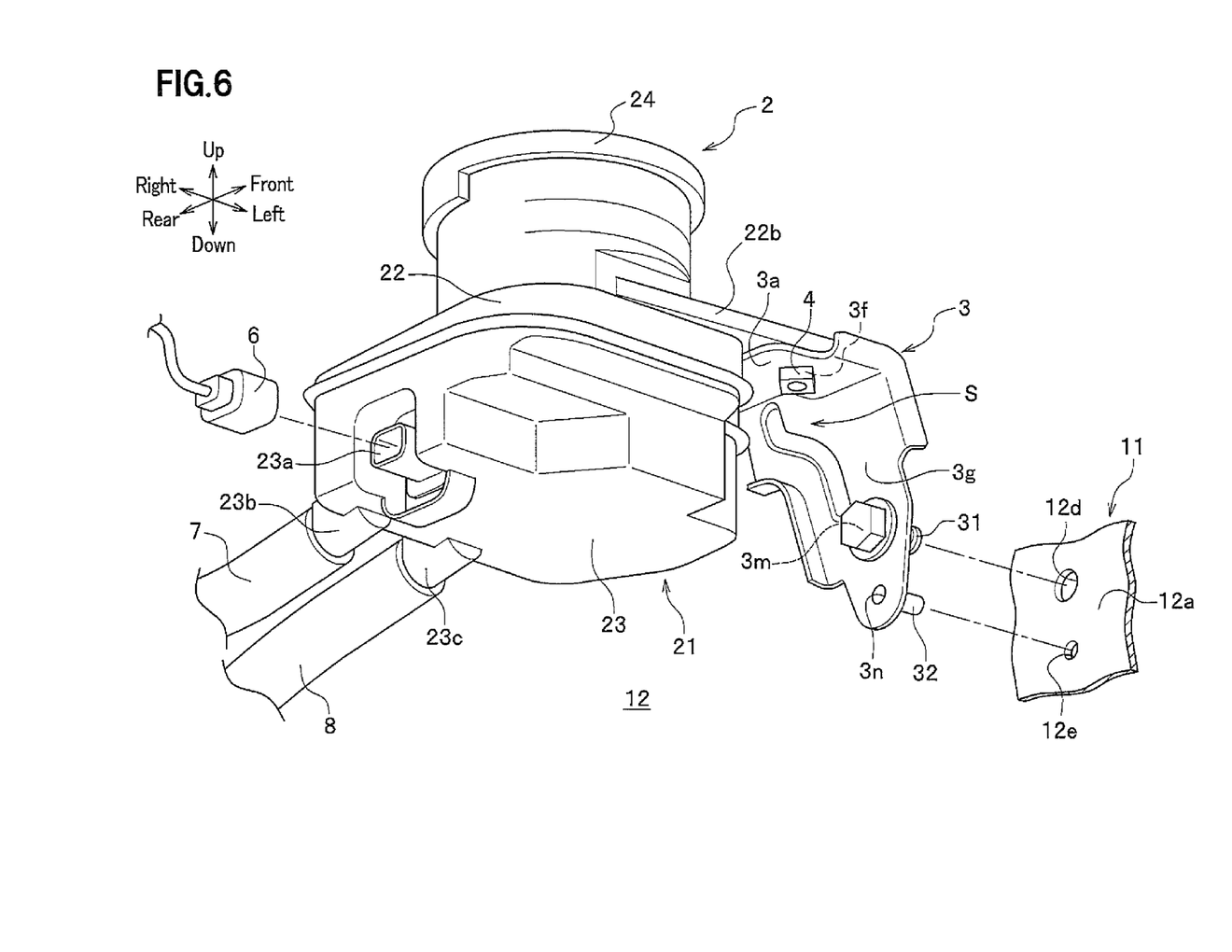
FIG. 6 is an exploded perspective view of an example of the supporting structure for the reserve tank according to the embodiment of the present invention.

As shown in FIG. 6, the lower case 23 is a case having a container shape for containing a brake fluid and includes a coupler part 23a formed on a right side surface thereof near the lower surface thereof, and a pair of tube connecting parts 23b and 23c formed on a vehicle rear side surface near the lower surface thereof.

The coupler part 23a is an electric connecting part to which a connector 6 is connected.

The tube connecting parts 23b and 23c are connecting parts to be connected to another ends of the tubes 7, 8 of which one ends are connected to a master cylinder (not shown) and comprise a substantially circular sleeve shape protrusion formed integrally with the lower case 23.

The cap 24 is a closing member for opening and closing the opening 22c and formed in a substantially circle in the plan view.

<<Configuration of Bracket>>

As shown in FIG. 6, the bracket 3 is a fixing member for fixing the reserve tank 2 to the vehicle body 11 and formed by a press process for a metal plate member. As shown in FIG. 3, the bracket 3 is integrally formed to include the horizontal surface part 3a, a supporting member 3b, a vertical movement restricting part 3c, the lower-surface supporting part 3d, a hollow part (notch) 3e, the fastened part 3f, a vehicle body side fixing part 3g, a step part 3h, reinforcing bent parts 3i, 3j, 3k, a reinforcing hollow part 3l, a fixing member inserting hole 3m, and a pin set hole 3n, and the fixing member 31 and the positioning pin 32 are attached thereto.

Figure 4:
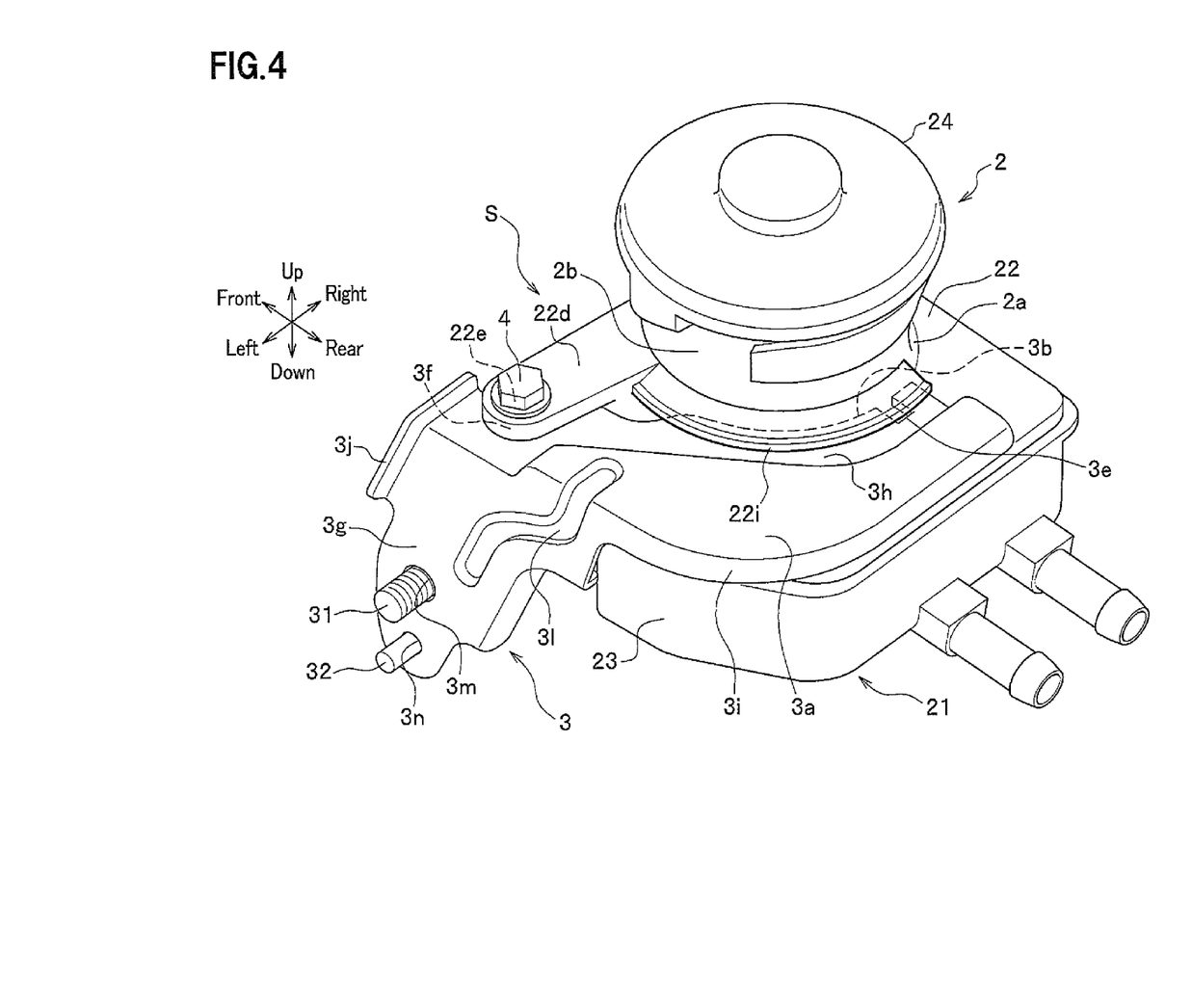
FIG. 4 is a perspective view of an example of the supporting structure for the reserve tank according to the embodiment of the present invention.

As shown in FIG. 4, the bracket 3 comprises a metal plate member formed in a substantially L shape to have the horizontal surface part 3a horizontally formed in a front view, and the vehicle body side fixing part 3g extending downward from a left side end of the horizontal surface part 3a.

In the bracket 3, the supporting member 3b is inserted into the bracket inserting part 22i and the fastened part 3f is fasten to the fastening part 22e with the fastening member 4 to have a neck hung structure for supporting a tank neck part of the reserve tank 2 (an intermediate part 2a in a vertical direction when the reserve tank 2 is fixed (fixed state)) as well as two parts, i.e., the fixing member inserting hole 3m and the pin set hole 3n, formed on the vehicle body side fixing part 3g at a side part in the vehicle body side direction are supported by the fixing member 31 and the positioning pin 32 on the side wall 12b (see FIG. 6). As described above, the bracket 3 is formed not on the lower surface of the reserve tank 2.

As shown in FIG. 6, the bracket 3 is disposed to provide an open space S (see FIG. 2) on the vehicle front side of the reserve tank 2 when the bracket 3 to which the reserve tank 2 is fixed is fixed to the vehicle body 11.

In addition, if the part to which the bracket 3 is fixed is a wall shape part of the vehicle body 11, the part to which the bracket 3 is fixed is not specifically limited. Hereinbelow an example will be described with an example in which the bracket is fixed to the vertical wall 12a (inner wall) of the engine room 12.

As shown in FIG. 3, the horizontal surface part 3a is a substantially horizontally formed part on the bracket 3 and disposed on the lid-like part 22a horizontally arranged on the upper case 22 when the bracket 3 is fixed to the reserve tank 2. The horizontal surface part 3a is formed to horizontally extend from a front end of the upper part of the vehicle body side fixing part 3g in a side view toward the vehicle rear direction side and extend from the front end of the upper part (a left end part of the reserve tank 2) of the vehicle body side fixing part 3g in a back side view to a center par of the circular sleeve part 22b. At the horizontal surface part 3a, the supporting member 3b, the vertical movement restricting part 3c, the lower-surface supporting part 3d, the hollow part 3e, the fastened part 3f, the step part 3h, the reinforcing bent parts 3i, 3j, and the reinforcing hollow part 3l are formed.

The supporting member 3b is a part supporting the intermediate part 2a in the vertical direction when the reserve tank 2 is fixed to the vehicle (in the fixed state) and a part supporting the lower surface of the extending part 22f. The supporting member 3b is formed in an arc shape in a plan view along the side surface 2b and the extending part 22f of the circular sleeve part 22b of the reserve tank 2. The supporting member 3b comprises the vertical movement restricting part 3c and the hollow part 3e for providing the neck hang state at an outer circumference lower end of the circular sleeve part 22b.

The vertical movement restricting part 3c is a part for restricting a vertical movement of the reserve tank 2 and supporting the reserve tank 2 in such a state that the reserve tank 2 is inserted into the bracket inserting part 22i with contact to the lower surface of the extending part 22f and the upper surface of the bracket supporting part 22. The vertical movement restricting part 3c is formed from a right side front edge part of the step part 3h which is step down from the horizontal surface part 3a to the right side front edge part (on the side of the circular sleeve part 22b) to have an arc shape in a plan view.

The lower-surface supporting part 3d is a part which is disposed to be closely attached to a lower surface of the extending part 22f when the bracket 3 is mounted on the reserve tank 2 to support the reserve tank 2 and formed to support, in the reserve tank 2, the extending part 22f at a region not exceeding a semiperimeter of the circular sleeve part 22b on the vehicle rear side. The lower-surface supporting part 3d is formed on the both sides of the hollow part 3e of the supporting member 3b.

The hollow part 3e is a part for preventing the bracket 3 from rotating on the fastened part 3f as a center in a rotation direction (a direction shown by an arrow b) and shifting in a left-right direction as a result of the protruding part 22h being fitted into the hollow part 3e when the bracket 3 is mounted on the reserve tank 2. The hollow part 3e is formed at a position on a vehicle rearward side of the lower-surface supporting part 3d.

As shown in FIG. 3, the fastened part 3f is a part in which the fastening member 4 inserted into the fastening part 22e of the reserve tank 2 is screwed and comprises a female thread. The fastened part 3f is formed at a vehicle front side end part of the horizontal surface part 3a at a position opposite to and apart from the hollow part 3e on the same plane where the horizontal surface part 3a is formed.

As shown in FIG. 6, the vehicle body side fixing part 3g is a part to be fixed to the vertical wall 12a extending in a vehicle front-rear direction of the engine room 12 on the side of the vehicle body 11 and formed to be bent and protrude from the left side front end of the horizontal surface part 3a downwardly in a tongue shape. At a lower end of the vehicle body side fixing part 3g, the fixing member inserting hole 3m and the pin set hole 3n are formed.

As shown in FIG. 3, the step part 3h is a part to have a form bent stepwise and extending from a middle of the right side end to a middle of the left side end along a circular art center line of the horizontal surface part 3a. The stepwise bent part forms an edge line for reinforcement.

Reinforcing curve parts 3i, 3j, and 3k are parts where edges of the bracket 3 are reinforced by bending at a right angle and formed at a plurality locations at circumferential edge of the bracket 3.

The reinforcing bent part 3i is a part formed by bending an outer edge of the horizontal surface part 3a in a downward direction and formed to extend from a right end part on a vehicle rear side to an upper end part on the vehicle rear side of the vehicle body side fixing part 3g on the horizontal surface part 3a.

A reinforcing bent part 3j is a part provided by bending a tip part of the bracket 3 at a right angle in an upward direction and a left direction and formed to extend from the horizontal surface part 3a to the vehicle body side fixing part 3g at front end part. The horizontal part on an upper side of the reinforcing bent part 3j is disposed to abut a front end part of the mounting piece 22d.

A reinforcing bent part 3k is a part formed by bending an edge part on the vehicle rear side of the vehicle body side fixing part 3g in a right direction at a right angle.

The reinforcing hollow part 3l is a part reinforced by a hollow groove shape in cross section of the bracket 3 for reinforcing and formed to extend from the middle part of the vehicle body side fixing part 3g to the horizontal surface part 3a.

As shown in FIG. 6, the fixing member inserting hole 3m is a hole into which a fixing member 31 for fixing the bracket 3 to the vehicle body 11, formed at a substantially middle of the vehicle body side fixing part 3g. On a lower side (tip end side) near the fixing member inserting hole 3m, the pin set hole 3n is preferably formed in a pin setting hole. In addition, the fixing member inserting hole 3m is preferably formed in an oblong hole with a longer size in a front-rear direction for position adjustment of the fixing member 31 to fix the bracket 3 to the vertical wall 12a in the engine room 12 to allow the fixing member 31 to be adjusted.

The pin set hole 3n is a hole to which a positioning pin 32 for positioning the bracket 3 so as to fix the bracket 3 to the vehicle body 11.

The fixing member 31 is a bolt for fixing the bracket 3 to the vertical wall 12a of the vehicle body 11 and screwed with a female threading part 12d of the vehicle body 11 through the fixing member inserting hole 3m of the bracket 3.

The positioning pin 32 is fixed, at a base end part thereof, to the pin set hole 3n and a tip end is inserted into a pin inserting hole 12e of the vehicle body 11.

<<Structure of Brake Fluid Vacuum Charging Jig>>

Figure 7:
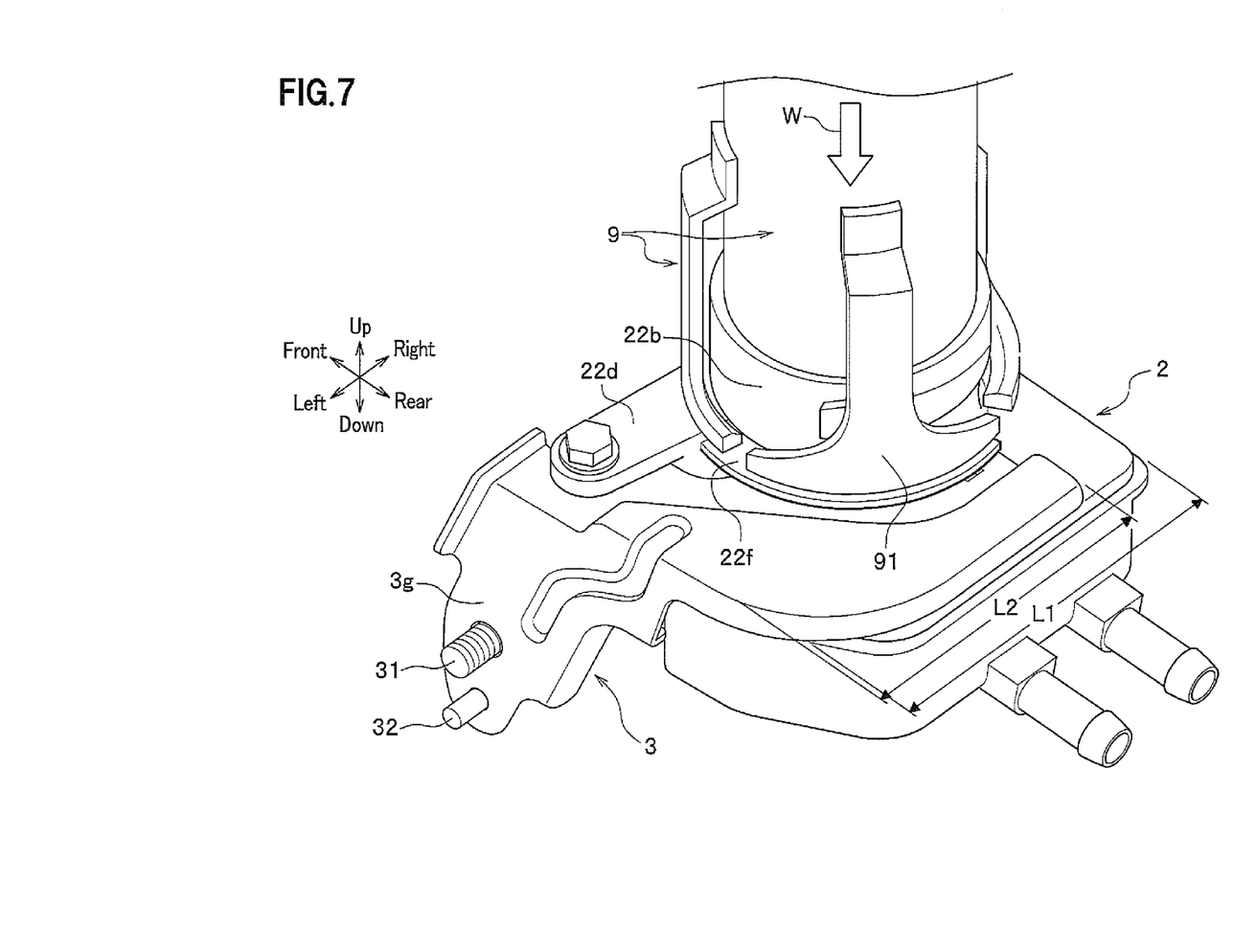
FIG. 7 is a perspective view illustrating a state in which a vacuum brake fluid charging jig is attached to the reserve tank.

As shown in FIG. 7, a brake fluid vacuum charging jig 9 is a device used in injecting the brake fluid (brake oil) into the reserve tank 2 and includes a connecting part 91 which is placed on and fixed to the extending part 22f of the reserve tank 2.

<<Operation>>

Next, with reference to FIGS. 1 to 7, an operation of the supporting structure for the reserve tank according to the present invention will be described below together with a mounting process for mounting the reserve tank 2 on the vehicle body 11.

First, with reference to FIGS. 3 and 6, a case where the reserve tank 2 is mounted on the side wall 12b of the engine room 12 will be described below.

In this case, the positioning pin 32 shown in FIG. 3 is previously fixed to the pin set hole 3n of the bracket 3. First, the hollow part 3e of the bracket 3 is engaged with the protruding part 22h and the lower-surface supporting part 3d is inserted into the bracket inserting part 22i. Then, the lower-surface supporting part 3d is, at an upper surface thereof, tightly contact with a lower surface of the extending part 22f, and a lower surface thereof tightly contacts with an upper surface of the bracket supporting part 22j and supported between the extending part 22f and the bracket supporting part 22j.

Next, the fastening member 4 is inserted into the fastening part 22e and the male part is screwed with the fastened part 3f to mount the bracket 3 on the reserve tank 2.

In the bracket 3, the hollow part 3e fitted into the protruding part 22h and the fastened part 3f fixed to the fastening part 22e are formed on the same plane of the horizontal surface part 3a, so that mounting does not depend on sizes in the height direction. Accordingly, assembling accuracy in the reserve tank 2 can be enhanced, so that the bracket 3 can be accurately mounted on the predetermined position.

Following this, as shown in FIG. 6, the positioning pin 32 on the bracket 3 is inserted into the pin inserting hole 12e, being a reference position of the side wall 12b of the engine room 12 (see FIG. 1). After that, the fixing member 31 is inserted into the fixing member inserting hole 3m (see FIG. 3) for positioning relative to the vertical wall 12a and screwed. This completes the mounting the bracket 3 on the vertical wall 12a.

As described above, the bracket 3 and the reserve tank 2 fixed to the vertical wall 12a in the engine room 12 (see FIG. 1), which are able to be fixed with a few bolts, etc., i.e., total two (one fastening member 4 and one fixing member 31) through a few operating process for mounting, can be mounted on the vehicle body 11 in a short time.

Further, the bracket 3, supporting the reserve tank 2 as described above, holds the side surface 2b of the intermediate part 2a in the vertical direction in fixing the reserve tank 2 to the vehicle (in the fixing state) without holding the lower surface, so that weight saving can be provided because the whole can be miniaturized and light-weighted by weight corresponding to no support of the lower surface of the reserve tank 2 with a simplified shape.

As shown in FIG. 6, the coupler part 23a is formed on a right side surface of the reserve tank 2, i.e., the bracket 3 is not disposed under the coupler part 23a, so that the connector 6 can be easily inserted from a right direction in the engine room 12, which results in enhancement in the operationability in connecting operation. In addition, the coupler part 23a has a good visibility in viewing a connecting status between the coupler part 23a and the connector 6 in connecting operation for connecting the connector 6 and there are no obstacle members in the vicinity, so that maintenance and assembling are easy with a good maintainability.

Next, mainly referring to FIG. 7, a case will be described where the brake fluid (operating liquid) is injected into the reserve tank 2.

In this case, first, the cap 24 is removed from the reserve tank 2 fixed to the vehicle body 11 with the fastening member 4 and the fixing member 31.

Next, the connecting part 91 of the brake fluid vacuum charging jig 9 is placed on an upper part of the extending part 22f of the reserve tank 2, and the brake fluid vacuum charging jig 9 is set on the reserve tank 2, as shown in FIG. 7, through coupling a supplying opening (not shown) to a circumferential edge of the opened opening 22c.

After that, the brake fluid is injected into the reserve tank 2 through the opening 22c (see FIG. 3) with the brake fluid vacuum charging jig 9.

After injection, the brake fluid vacuum charging jig 9 is removed from the reserve tank 2 and the cap 24 (see FIG. 1) is fit to cover the opening 22c (see FIG. 1).

When the injection operation of the brake fluid through placing the brake fluid vacuum charging jig 9 on the reserve tank 2, a weight W of the reserve tank 2, the brake fluid vacuum charging jig 9 and the brake fluid is applied to the extending part 22f. In this case, the reserve tank 2 surely receive the weight W with reduction in stress because the extending part 22f receiving the weight W of the brake fluid vacuum charging jig 9, etc. is formed to extend in a circular circumference direction along a circumferential edge lower end on the side of the bracket 3 of the circular sleeve part 22b.

The extending part 22f, which is formed at a lower end part of the circular sleeve part 22b formed to extend in vertical direction, can be supported, at an arm part of the connecting part 91 of the brake fluid vacuum charging jig 9 with the circular sleeve part 22b, so that the brake fluid vacuum charging jig 9 can be supported in a stable status.

In addition, the weight W of the brake fluid vacuum charging jig 9, etc. loaded on the extending part 22f is applied to the bracket 3 through the extending part 22f because the upper surface of the supporting member 3b of the bracket 3 tightly contacts with the lower surface of the extending part 22f, so that the weight W can be efficiently received by the bracket 3.

As shown in FIG. 7, the bracket 3 has a length L2 in the left-right direction shorter than a length L1 in the left-right direction of the reserve tank 2, and is made to have substantially a half of a length in the left-right direction of the conventional bracket 300 (see FIGS. 8 to 10). Accordingly, if the weight W of the brake fluid vacuum charging jig 9, etc. is loaded on the bracket 3, the bracket 3, having a short length in the left-right direction, a moment applied to the vehicle body side fixing part 3g is small, and the supporting member 3b supports the intermediate part 2a of the reserve tank 2, so that the weight W and the reserve tank 2 can be surely supported.

As described above, the bracket 3, having a small size and a light weight, and a high strength against the weight W in the vertical direction, can be surely fixed to the side wall 12b without play and has such stiffness as to impede the brake fluid injection operation, etc.

In addition, the present invention is not limited to the above-described embodiments, but may be modified within the scope of the technical idea and ranges over these modification and modified invention.

MODIFICATIONS

In the above-described embodiments, as the vehicle 1, a left hand drive vehicle is exemplified. In a case where the vehicle 1 is a right hand drive vehicle, the reserve tank 2 and the bracket 3 can be symmetrically formed relatively to the above-described embodiments and disposed at symmetrical position on the vertical wall 12a such as the right side wall 12b in the engine room 12.

Further, in the above-described embodiments, as the location at which the bracket 3 is installed, the side wall 12b within the engine room 12 is exemplified. However, as long as the location allowing the bracket 3 to be fixed, the location may be not in the engine room 12, but the vertical wall 12a, etc. of the vehicle body 11 outside the engine room 12.

As described above, the bracket 3 can be applied to any type of vehicle 1 as a fixing a part to the vehicle body 11.

Further, in the above-described embodiment, the reserve tank 2 is exemplified as an example of an auxiliary device to be mounted on the bracket 3. However, the bracket 3 may be a part for supporting other parts such as the tanks like a clutch reserver, devices and a part for supporting other parts.

The invention claimed is:

1. A supporting structure for a reserve tank that is configured to fix the reserve tank to be filled with an operating fluid to a vehicle body side with a bracket, wherein:
the bracket comprises a supporting part configured to support an intermediate part which is intermediate in a vertical direction in fixing the reserve tank to the vehicle;
the supporting part comprises a vertical movement restricting part configured to restrict a vertical movement in fixing the reserve tank to the vehicle;
and wherein the reserve tank comprises:
a fastening part configured to fasten the reserve tank to a fastened part formed on the bracket with a fastening member, a rotation restricting part, at a location apart from the fastening part, configured to restrict rotation of the bracket on the fastening part as a center, and an extending part protruding from a side surface of the reserve tank outwardly in a diametrical direction and extending in a circumferential direction from a side of the fastening part to the rotation restriction part, and further wherein:

the reserve tank comprises a circular sleeve part including, at an upper end thereof, an opening into which the operating fluid is injected, the rotation restricting part and the extending part are formed on the circular sleeve part and the rotation restricting part includes a protruding part formed to protrude outwardly in a diametrical direction from the side surface of the circular sleeve part, and the bracket is formed on the lower-surface supporting part and includes a hollow part fitted into the protruding part.

2. The supporting structure as claimed in claim 1, wherein the protruding part is disposed on a vehicle rear side of the circular sleeve part when the reserve tank is mounted on the vehicle body through the bracket;

wherein the bracket includes:
   a vehicle body side fixing part to be fixed to a vertical wall on the vehicle body side extending in the vehicle front-rear direction; and
   a horizontal surface part extending from the vehicle body side fixing part toward the vehicle rear side via a surface of the reserve tank on the vehicle front side end part to form a surface extending in a vehicle horizontal direction;

wherein the fastened part is formed at the vehicle front side end part on the horizontal surface part;

wherein the horizontal surface part includes the lower-surface supporting part and the hollow part;

and wherein the lower-surface supporting part is provided to support the extending part at a region not exceeding a semiperimeter of the circular sleeve part on the vehicle rear side.

3. The supporting structure as claimed in claim 1, wherein the reserve tank is formed of a resin;

and wherein the bracket comprises a plate member made of a metal and is disposed to provide an open space on a vehicle front side of the reserve tank when the bracket to which the reserve tank is mounted is fixed to the vehicle body side.

* * * * *